United States Patent
Anghel et al.

(10) Patent No.: US 9,458,770 B2
(45) Date of Patent: Oct. 4, 2016

(54) OPTIMIZED ENGINE CONTROL USING SECONDARY POWER SYSTEM HORSEPOWER EXTRACTION INFORMATION

(71) Applicant: HONEYWELL INTERNATIONAL INC., Morristown, NJ (US)

(72) Inventors: Cristian Anghel, Oro Valley, AZ (US); Wayne Pearson, Oro Valley, AZ (US); Sean Ellis, Derby (GB); Glenn A. Knight, Belper (GB)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 161 days.

(21) Appl. No.: 14/242,265

(22) Filed: Apr. 1, 2014

(65) Prior Publication Data
US 2015/0275768 A1 Oct. 1, 2015

(51) Int. Cl.
G06F 19/00 (2011.01)
F02C 9/18 (2006.01)
F02C 7/32 (2006.01)
B64D 13/06 (2006.01)

(52) U.S. Cl.
CPC . *F02C 9/18* (2013.01); *F02C 7/32* (2013.01); *B64D 2013/0618* (2013.01); *F05D 2270/335* (2013.01); *Y02T 50/56* (2013.01)

(58) Field of Classification Search
CPC ............ B60W 2710/0666; B60W 2510/0657; F02D 2200/00; F02C 9/18; G05D 16/02; F04D 25/02
USPC ................ 701/99; 417/53, 321; 137/12, 485
See application file for complete search history.

(56) References Cited

U.S. PATENT DOCUMENTS

| | | | | |
|---|---|---|---|---|
| 5,313,778 A | * | 5/1994 | Sweet | F02C 9/18 60/772 |
| 5,670,784 A | * | 9/1997 | Cusack | G01J 5/0014 250/370.01 |
| 5,813,630 A | * | 9/1998 | Williams | B64D 13/06 244/118.5 |
| 6,141,951 A | * | 11/2000 | Krukoski | F04D 27/001 60/772 |
| 7,975,465 B2 | * | 7/2011 | Morris | F02C 6/08 244/60 |
| 8,459,038 B1 | * | 6/2013 | Lickfold | 60/772 |
| 2004/0117148 A1 | * | 6/2004 | Davies | G05B 23/0221 702/182 |
| 2005/0103931 A1 | | 5/2005 | Morris | |
| 2005/0229838 A1 | | 10/2005 | Lyons | |
| 2007/0079594 A1 | * | 4/2007 | Firey | F02C 3/28 60/39.464 |

(Continued)

FOREIGN PATENT DOCUMENTS

| | | |
|---|---|---|
| CA | 2447604 | 12/2008 |
| EP | 1788223 A2 | 5/2007 |

OTHER PUBLICATIONS

Search report from EP application No. 15159755.6 dated Sep. 21, 2015.

(Continued)

*Primary Examiner* — Shardul Patel
(74) *Attorney, Agent, or Firm* — Shimokaji IP

(57) ABSTRACT

Apparatus for controlling a turbine aircraft engine may include apparatus to determine an amount of secondary power extraction from the engine, a secondary load processor configured to receive and condition secondary power extraction data. An electronic engine controller (EEC) may be configured to receive secondary load data from the secondary load processor and produce commands to open bleed-air valves of the engine, said commands being based on the secondary load data.

14 Claims, 3 Drawing Sheets

(56) References Cited

U.S. PATENT DOCUMENTS

| | | | |
|---|---|---|---|
| 2009/0097962 A1* | 4/2009 | Williams | F01D 17/04 415/48 |
| 2009/0314004 A1* | 12/2009 | Van Der Woude | B64D 33/10 60/785 |
| 2010/0000223 A1* | 1/2010 | Colotte | F02C 7/32 60/773 |
| 2012/0180509 A1* | 7/2012 | DeFrancesco | B64D 13/08 62/172 |
| 2014/0130883 A1* | 5/2014 | Couture | B64D 13/00 137/12 |

OTHER PUBLICATIONS

W. Horn et al., "Opportunities and Challenges for More Intelligent Gas Turbines", Deutscher Luft-und Raumfahrtkongress 2008, DocumentID 81265.

* cited by examiner

OPTIMIZED ENGINE CONTROL USING SECONDARY POWER SYSTEM HORSEPOWER EXTRACTION INFORMATION

BACKGROUND OF THE INVENTION

The present invention generally relates to aircraft propulsion and power systems. More particularly, the invention relates to apparatus and methods by which propulsion engines may be operated to maintain a balance between propulsion requirements and delivery of power to meet secondary power (non-propulsive power) requirements within the aircraft.

A typical commercial aircraft may be propelled with turbine engines. One or more of the engines of such an aircraft may be provided with secondary power-takeoff shafts that may be coupled with an auxiliary gearbox to drive electrical generators and hydraulic pumps during flight. Additionally, some aircraft engines may deliver bleed air to drive an environmental control system (ECS) of the aircraft so that proper cabin pressurization and temperature control may be maintained.

An aircraft turbine engine may be controlled to rotate at various speeds in order to satisfy various propulsion requirements. During take-off and climbing, thrust requirements may be high and engine speeds may be correspondingly high. During descent, thrust requirements may be low and engine speed may be correspondingly low. If the engine were used exclusively for providing thrust, then engine speed, during low thrust requirement periods could be lowered to a rate that just exceeds surge or stall conditions for the engine. However, because a typical engine drives secondary loads through a power takeoff shaft and/or through extracted bleed air, the engine speed must be maintained at a level that may accommodate the secondary loading even when thrust requirements may be virtually non-existent, e.g., during descent. This may result in a need to maintain a higher engine speed than that which is needed to supply thrust so that surge conditions do not develop in the engine. Balancing between a low thrust requirement and a higher than necessary engine power output is typically achieved by opening bleed air valves to reduce undesired pressure in the engine while maintaining the engine in a non-surge state. When bleed valves are opened, energy from the engine is effectively discharged to the atmosphere and thus becomes wasted energy.

A typical electronic engine controller (EEC) may be programmed so that a maximum amount of secondary loading is established as a basis for determining how much power may be needed from the engine during low thrust requirements. In other words, a worst-case secondary power requirement is programmed into the EEC. The bleed valves may be opened on the basis of signals from an EEC that is so programmed.

While such a system may assure that secondary loading does not produce surge conditions in the engine, it may nevertheless be energy wasteful. If actual secondary loading is lower than the worst-case condition, then engine surge could be precluded with a reduced amount of bleed air expulsion from the engine. But it has heretofore been impracticable to determine actual or real-time secondary power consumption in a manner that would allow an EEC to safely control bleed air valve opening on a real-time basis.

As can be seen, there is a need for a system by which secondary loading of an aircraft engine may be accurately determined on a real-time basis so that an EEC may control bleed air valve opening as a function of the secondary loading and thereby maintain a desired surge margin without excessive bleed air expulsion from the engine.

SUMMARY OF THE INVENTION

In one aspect of the present invention, apparatus for controlling a turbine aircraft engine may comprise: a torque meter coupled with a power take-off shaft of the engine, a secondary load processor configured to receive a torque signal from the torque meter and calculate secondary load data based on the torque signal; and an electronic engine controller (EEC) configured to receive secondary load data from the secondary load processor and produce commands to open bleed-air valves of the engine, said commands being based on the secondary load data and engine operating conditions.

In another aspect of the present invention, apparatus for controlling a turbine aircraft engine may comprise: a secondary power monitoring processor coupled with an electrical generator system that is driven by the engine, the secondary power monitoring processor being configured to calculate secondary load data based, at least in part, on current and voltage signals from the electrical generator system; and an electronic engine controller (EEC) configured to receive secondary load data from the secondary power monitoring processor and produce commands to open bleed-air valves of the engine, said commands being based on the secondary load data.

In still another aspect of the present invention, a method for controlling a turbine engine on an aircraft may comprise the steps of: determining an amount of secondary power extraction from the engine by a) determining torque applied to a power take-off shaft of the engine, b) determining power consumption of a generator driven by the engine or c) determining pneumatic power consumption of bleed air driven apparatus of the aircraft; producing a secondary power signal that includes a quantification of the determined amount of extracted secondary power; providing the signal to an electronic engine controller (EEC) for the engine; and producing commands within the EEC for opening of bleed-air valves, said commands being at least partially based on the secondary power signal.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

The present invention generally provides a system by which secondary loading of an aircraft engine may be accurately determined on a real-time basis so that an electronic engine controller (EEC) may control bleed air valve opening as a function of the secondary loading and thereby maintain a desired surge margin without requiring excessive bleed air expulsion from the engine.

Figure 1:
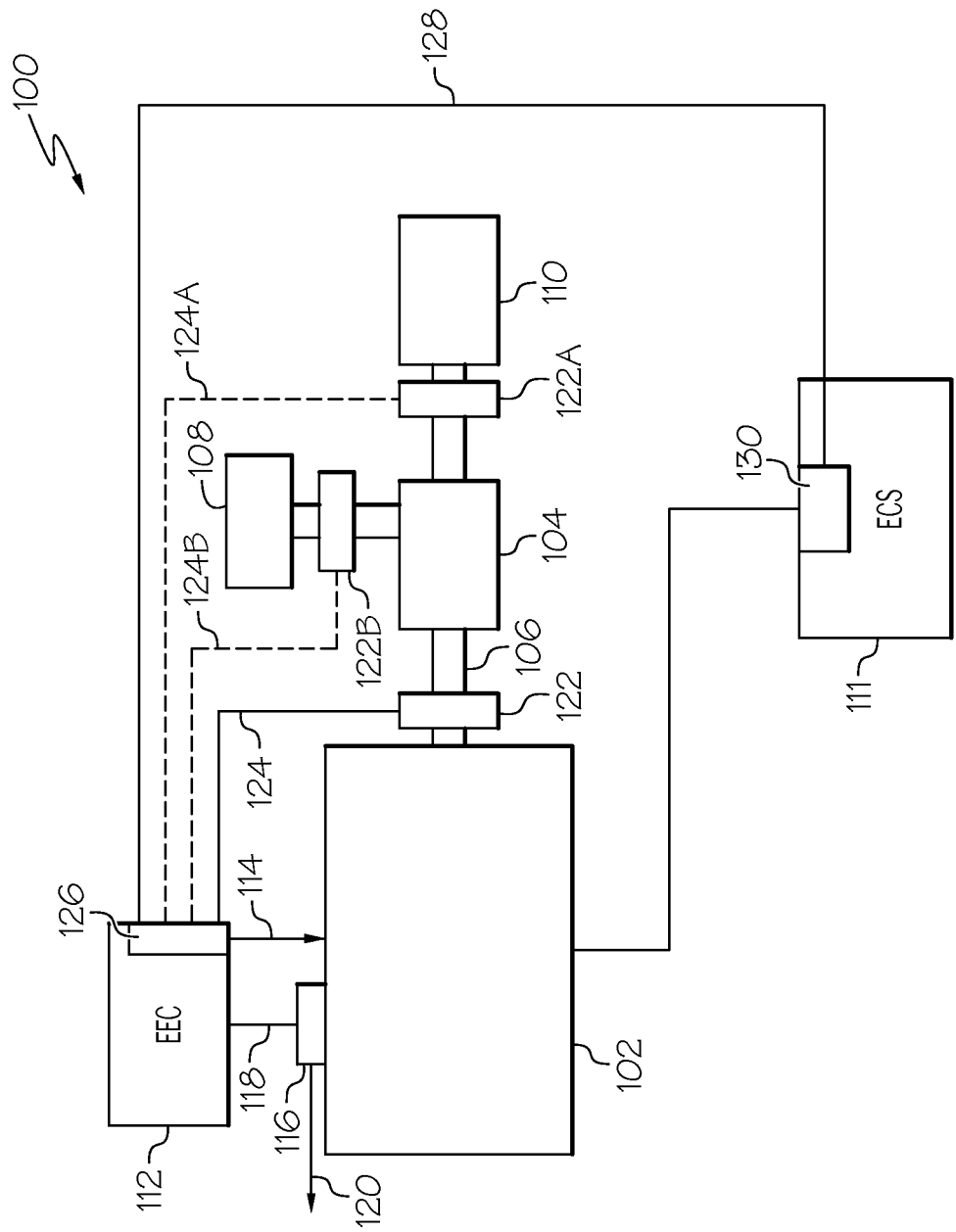
FIG. 1 is a schematic diagram of an aircraft power system in accordance with an embodiment of the invention.

Referring now to FIG. 1, an exemplary embodiment of an aircraft propulsion and power system 100, which may be installed in an aircraft, is shown in schematic form. The system 100 may include an aircraft propulsion engine 102 and an auxiliary gearbox 104 coupled to a power take-off shaft 106 of the engine 102. The system 100 may also include a hydraulic pump 108 and an electric generator 110 each of which may be coupled with the auxiliary gearbox 104. The engine 102 may provide power to propel an aircraft (not shown) by producing thrust. Production of thrust may be considered to be the primary power produced by the engine. In addition to providing thrust, the engine 102 may provide power to some secondary loads. For example, the shaft 106 may drive the gearbox 104 which may drive the electrical generator 110 and/or the hydraulic pump 108. In some cases, the engine 102 may supply bleed air to an environmental control system 111 (ECS) of the aircraft to maintain cabin pressurization and cabin temperature. Power to drive such loads may be considered to be secondary power.

An electronic engine controller 112 (EEC) may provide engine command signals 114 to the engine 102 in response to pilot initiated commands. The engine 102 may be provided with one or more bleed air valves 116 which may be operated responsively to commands or bleed-air signals 118 from the EEC 112. The bleed-air valves 116 may release bleed air 120 to the atmosphere outside the aircraft whenever it may be determined that the engine 102 may be operating with a speed and power output combination that may put the engine 102 at risk of surge stalling. Such surge-risk conditions may arise, for example during descent of the aircraft.

In operation, a torque meter 122 may be interposed between the engine 102 and the gearbox 104 and coupled with the shaft 106. The torque meter may provide a torque signal 124 to a secondary load processor 126 which may be coupled with or incorporated in the EEC 112. The EEC 112 may calculate requisite bleed-air valve opening to assure that at whatever engine speed may be at a particular moment, the engine 102 may remain free of surge risk. As a result of that calculation the EEC 112 may produce the bleed-air signal 118 and the bleed-air valves 116 may open only as required to maintain the engine 102 in a surge-risk free status. In other words, the signal 118 may define the number of the bleed-air valves 116 to be opened and durations of such openings.

In various alternate embodiments, a torque meter 122A may be interposed between the auxiliary gearbox 104 and the generator 110 and/or a torque meter 122B may be interposed between the auxiliary gearbox 104 and the hydraulic pump. The torque meters 122A and/or 122B may provide torque signals 124A and/or 124B to the secondary load processor 126.

In an aircraft that may be so equipped, the secondary load processor 126 may also be provided with a pneumatic power signal 128 from an air flow monitor 130 of the ECS 111. The processor 126 may combine the signals 124 and 128 to produce a composite real-time secondary load calculation. In that case the EEC 118 may command opening of the bleed-air valves 116 responsively to a composite secondary load that may include a pneumatic load of the ECS 111 and a mechanical load of the shaft 106.

Figure 2:
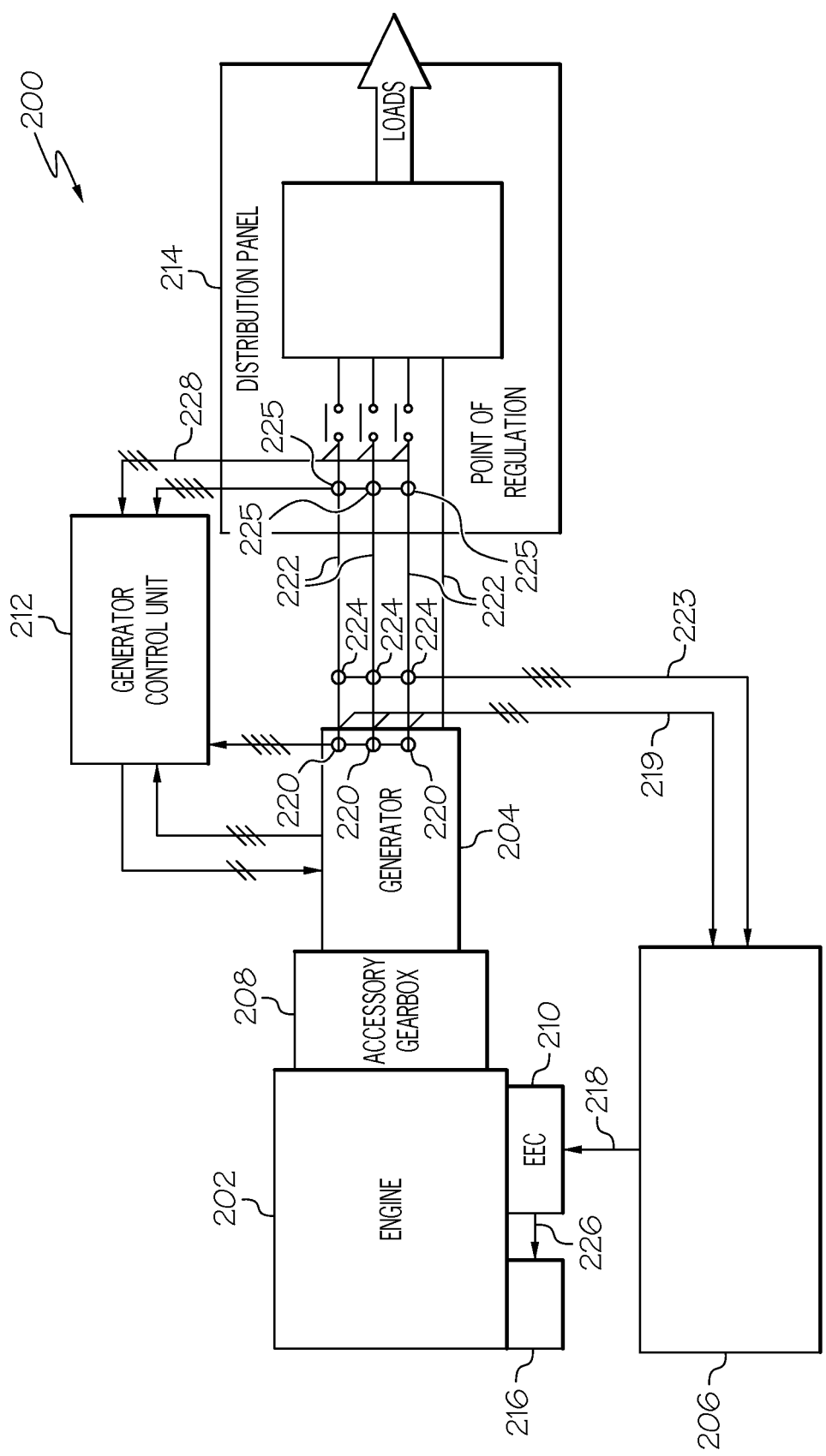
FIG. 2 is a schematic diagram of an aircraft power system in accordance with a second embodiment of the invention.

Referring now to FIG. 2, an exemplary embodiment of an aircraft propulsion and power system 200 is illustrated in schematic format. The power system 200 may be of a type that may be found in a so-called more electric aircraft (MEA). Typically an MEA may utilize electrical power to perform functions that might otherwise be performed with pneumatic or hydraulic power in other types of aircraft. Thus, the power system 200 may be structured to monitor secondary power by considering operational features of a generator 204 that may be coupled to an engine 202.

The system 200 may also be useful in a non-MEA aircraft wherein generator power can be used for partial power monitoring to good effect.

A secondary-power monitoring processor 206 may be added to a preexisting MEA (not shown) by employing relatively simple retrofitting. Within the power system 200, the engine 202, the generator 204, an accessory gearbox 208, an EEC 210, a generator control unit (GCU) 212, a distribution panel 214 and bleed-air valves 216 may be preexisting within the MEA. The secondary-power monitoring processor 206 may coupled with the EEC 210 to continuously deliver a secondary power signal 218 to the EEC 210. The processor 206 may receive voltage signals from the generator 204 by an interconnection 219 the generator's output and the processor 206. Additionally, the processor 206 may be coupled to power feeders 222 by an interconnection 223 between external current transformers 224 and the processor 206. External current transformers 225 may be connected to the generator control unit 212.

In operation, the processor 206 may perform current signal conditioning, voltage signal conditioning, speed signal conditioning and mechanical loss look-up. The processor 206 may perform a power take-off computation on a real-time basis and then produce the secondary power signal 218. The EEC 210 may employ the secondary power signal to determine, on a real-time basis, a requirement for bleed-air valve opening. The EEC may produce a bleed-air valve opening command signal 226 as needed to assure that the engine 202 may operate in a surge risk-free state.

Figure 3:
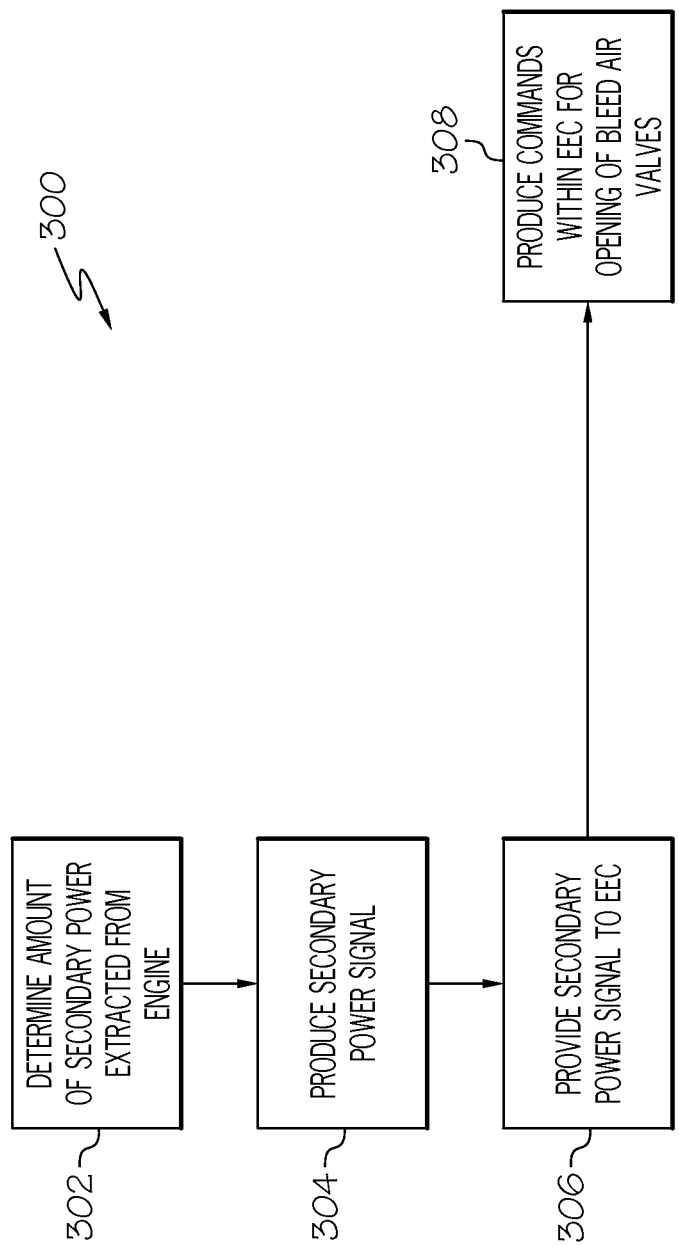
FIG. 3 is a flow chart of a method for controlling operation of an aircraft engine in accordance with an embodiment of the invention.

Referring now to FIG. 3, a flow chart 300 may illustrate a method for controlling a turbine engine on an aircraft. In a step 302 an amount of secondary power being extracted from the engine may be determined (e.g., the torque meter 122, the air flow meter 130 or the secondary power monitoring processor 206 may be employed to determine secondary power extraction on a real-time basis). In a step 304, a secondary power signal that includes a quantification of the determined amount of extracted secondary power may be produced (e.g.; the signal 124, the signal 128 and/or the signal 218 may be produced). In a step 306, the secondary power signal may be provided to an electronic engine controller (EEC) for the engine (e.g. the signal 128, 128 and/or 218 may be provided to the EEC 112 or 210). In a step 308 commands may be produced within the EEC for opening of bleed-air valves, the commands being at least partially based on the secondary power signal. (e.g., the EEC may produce commands 118 to open bleed air valves 116 or the EEC 210 may produce commands 226 to open the bleed air valves 216).

It should be understood, of course, that the foregoing relates to exemplary embodiments of the invention and that modifications may be made without departing from the spirit and scope of the invention as set forth in the following claims.

We claim:

1. An apparatus for controlling a turbine aircraft engine comprising: a torque meter coupled with a power take-off shaft of the engine, a secondary load processor configured to receive a torque signal from the torque meter and to calculate load data for secondary loads driven by the take-off shaft based on the torque signal; and an electronic engine controller (EEC) configured to receive the shaft-driven secondary load data from the secondary load processor and produce commands to maintain engine shaft power output at a level sufficient to drive secondary loading driven by the take-off shaft and to open bleed-air valves of the engine to release only enough bleed air to maintain a desired surge margin, said commands being based on the secondary load data; and an air flow monitor coupled to the engine to measure bleed air usage by a pneumatically powered apparatus of the aircraft; wherein the secondary load processor is configured to receive a pneumatic power signal and calculate composite secondary power load data based on both the torque signal and the pneumatic power signal; and wherein the EEC is configured to receive the composite secondary load data from the secondary load processor and produce the commands to open bleed-air valves of the engine, said commands being based on the composite secondary load data.

2. The apparatus of claim 1 wherein the pneumatically powered apparatus includes an environmental control system (ECS).

3. The apparatus of claim 1 wherein the torque meter is interposed between the engine and an auxiliary gearbox.

4. The apparatus of claim 3 wherein the auxiliary gearbox is coupled with a generator.

5. The apparatus of claim 3 wherein the auxiliary gearbox is coupled with a hydraulic pump.

6. The apparatus of claim 3 wherein the auxiliary gearbox is coupled with a generator and a hydraulic pump.

7. The apparatus of claim 1 wherein the torque meter is interposed between an auxiliary gearbox and the hydraulic pump.

8. The apparatus of claim 1 wherein the torque meter is interposed between an auxiliary gearbox and a generator.

9. An apparatus for controlling a turbine aircraft engine comprising: a secondary power monitoring processor coupled with a generator that is driven by the engine, the secondary power monitoring processor being configured to calculate secondary load data based, at least in part, on current and voltage signals from the generator; and an electronic engine controller (EEC) configured to receive load data for secondary loads, coupled to a shaft of the engine, from the secondary power monitoring processor and produce commands to maintain engine shaft power output sufficient to drive the secondary loads which are coupled to a shaft of the engine and to open bleed-air valves of the engine to maintain a desired surge margin with only minimal bleed air expulsion from the engine, said commands being based on the secondary load data and engine operating conditions; wherein the secondary power monitoring processor is coupled with the generator through an interconnection between the processor and external current transformers positioned on feeders that are interposed between the generator and a distribution panel.

10. The apparatus of claim 9 wherein the secondary power monitoring processor is configured to calculate secondary load data based, at least in part, on mechanical loss look-up and power factor computation.

11. The apparatus of claim 9 wherein the secondary power monitoring processor is coupled with the generator through an interconnection between the processor and current transformers positioned internally within the generator.

12. A method for controlling a turbine engine on an aircraft comprising the steps of: determining an amount of secondary power extraction from a shaft of the engine; producing a secondary power signal that includes a quantification of the determined amount of extracted secondary power for secondary loads coupled to a shaft of the engine; providing the signal to an electronic engine controller (EEC) for the engine; and producing commands within the EEC for maintaining engine shaft power output at a level sufficient to drive secondary loads coupled to a shaft of the engine and for releasing only enough bleed air from the engine to maintain a desired surge margin, said commands being at least partially based on the secondary power signal; wherein the step of determining the amount of secondary power extraction from the engine includes determining power consumption of a generator driven by the engine.

13. The method of claim 12 wherein determining power consumption of the generator includes power factor computation.

14. The method of claim 12 wherein determining power consumption of the generator further includes current signal conditioning, voltage signal conditioning, speed signal conditioning and mechanical loss lookup.

* * * * *